(12) United States Patent
Phillips et al.

(10) Patent No.: US 10,445,537 B2
(45) Date of Patent: Oct. 15, 2019

(54) RADIO FREQUENCY IDENTIFICATION TAG APPLICATION AND ENCODING DEVICE

(71) Applicant: PROMEGA CORPORATION, Madison, WI (US)

(72) Inventors: Travis Phillips, Stoughton, WI (US); Brian George, Brodhead, WI (US); Nicholas Roman Dachniwskyj, Madison, WI (US); Mark Sehmer, Stoughton, WI (US)

(*) Notice: Subject to any disclaimer, the term of this patent is extended or adjusted under 35 U.S.C. 154(b) by 0 days.

(21) Appl. No.: 15/457,170

(22) Filed: Mar. 13, 2017

(65) Prior Publication Data

US 2017/0300724 A1    Oct. 19, 2017

Related U.S. Application Data

(60) Provisional application No. 62/312,238, filed on Mar. 23, 2016.

(51) Int. Cl.
*G06K 19/00* (2006.01)
*G06K 7/10* (2006.01)
*B07C 5/34* (2006.01)
*G06K 19/077* (2006.01)

(52) U.S. Cl.
CPC ........ *G06K 7/10316* (2013.01); *B07C 5/3408* (2013.01); *G06K 19/077* (2013.01)

(58) Field of Classification Search
CPC . G06K 7/08; G06K 19/00; G06K 7/00; G06F 17/00
USPC ................. 235/451, 375, 439, 487
See application file for complete search history.

(56) References Cited

U.S. PATENT DOCUMENTS

| | | | |
|---|---|---|---|
| 2002/0193225 A1* | 12/2002 | Raming | B42D 15/006 493/375 |
| 2004/0027180 A1 | 2/2004 | Usami | |
| 2005/0247399 A1 | 11/2005 | Oakes et al. | |
| 2006/0277269 A1* | 12/2006 | Dent | G06F 19/3462 709/217 |
| 2007/0043469 A1* | 2/2007 | Draper | G06F 19/3462 700/231 |
| 2007/0075141 A1 | 4/2007 | Veitch | |
| 2007/0126578 A1* | 6/2007 | Broussard | G06K 17/0022 340/572.1 |
| 2008/0012687 A1 | 1/2008 | Rubinstein | |

(Continued)

FOREIGN PATENT DOCUMENTS

EP    2068268 A1    6/2009
WO    2006029105 A2    3/2006

OTHER PUBLICATIONS

International Search Report for Intl Appl. No. PCT/US2017/022084 dated Jun. 21, 2017.

*Primary Examiner* — Edwyn Labaze
(74) *Attorney, Agent, or Firm* — McAndrews, Held & Malloy, Ltd.

(57) ABSTRACT

A radio frequency identification (RFID) encoding device can comprise an applicator, an RFID reader with an antenna, and a housing having a receptacle. The receptacle can be configured to receive a vial. The applicator can be configured to apply an RFID tag to the vial. The RFID reader can have at least one antenna. The antenna can be configured to communicate with the RFID tag. The device can be configured to communicate with a host computer.

22 Claims, 4 Drawing Sheets

(56) References Cited

U.S. PATENT DOCUMENTS

| | | | |
|---|---|---|---|
| 2010/0186871 A1* | 7/2010 | Skaggs | B65C 3/14 |
| | | | 156/60 |
| 2010/0236712 A1* | 9/2010 | Basgil | B65C 9/188 |
| | | | 156/324 |
| 2012/0147360 A1* | 6/2012 | Germini | B65C 9/067 |
| | | | 356/138 |
| 2012/0256806 A1 | 10/2012 | Davidowitz et al. | |
| 2014/0197954 A1* | 7/2014 | Caputo | G06K 7/10366 |
| | | | 340/572.1 |
| 2015/0127362 A1* | 5/2015 | DeBusk | G06F 19/328 |
| | | | 705/2 |
| 2017/0286903 A1* | 10/2017 | Elizondo, II | H04B 17/318 |

* cited by examiner

RADIO FREQUENCY IDENTIFICATION TAG APPLICATION AND ENCODING DEVICE

RELATED APPLICATIONS

This application claims priority to and benefit from U.S. Provisional Application No. 62/312,238, filed on Mar. 23, 2016, which is hereby incorporated by reference herein in its entirety.

BACKGROUND

In general, the present disclosure relates to methods and systems that employ radio frequency identification (RFID) techniques.

The identification industry has undergone many changes over the past few years, especially with respect to the use of transponders to track and identify items. By replacing handwritten labels, RFID systems employ RFID tags, which are applied to objects such as vials. The RFID tags can be encoded with information relating to the vial such as vial contents and other information. Each RFID tag can be individually and manually scanned to procure the information stored on the RFID tag, for example, when the RFID tag is taken out of a storage apparatus.

Typically, a log of the contents of the vials in the storage apparatus is maintained. However, since the storage apparatus can hold a large number of vials (e.g., approximately 20,000 1-2 mL vials), tracking vial inventory can be difficult.

One conventional way to track inventory employs attaching or connecting an RFID tag to each stored vial. The vials are placed in or removed from the storage apparatus. However, the tags on the vials must be individually and manually read (e.g., scanned) with an RFID reader, which is held by an operator (e.g., a scientist, technician, etc.) to electronically identify the vials outside of the storage device. Before the vials are added to the storage apparatus, a given RFID vial tag is individually read, and the inventory list associated with the storage apparatus is updated or initially generated by adding vial information to the list. Similarly, after vials are removed from the storage apparatus, the RFID tag is individually read, and the inventory list is updated by removing the vial information associated with the removed vial from the inventory list.

This technique, however, is labor intensive and time consuming since a manual RFID reading step is required each time an individual vial is added or removed from the storage device. Failure by the operator to perform this RFID reading step can cause errors in the inventory list for the storage device. Further, by manually and repeatedly performing the scan and update steps, the inventory operation can be prone to human errors such as miscommunications, misuses, overscanning, underscanning, omitting steps, and other problems which, in turn, can be the cause of, for example, significant inventory control errors, inventory logistical planning difficulties, loss of samples or vials, missing chain of custody data, and inventory restocking delays.

It would be desirable to have a device that substantially automates the inventory tracking process and overcomes one or more of the problems discussed above.

BRIEF SUMMARY

The present disclosure relates, in various embodiments, to a radio frequency identification (RFID) device. The RFID device can include, for example, an applicator, an RFID reader, and a housing with a receptacle. The receptacle can be configured to receive a vial. The applicator can be configured to apply an RFID tag to the vial. The reader with an attached antenna can be configured to communicate with the RFID tag and a host computer.

The present disclosure relates, in various embodiments, to a system that includes an RFID device and a host computer. The RFID device can include a housing. The housing can have a receptacle. The receptacle can be configured to receive a vial. The RFID device can be configured to associate the vial with an identifier. The RFID device can be configured to communicate the identifier of the vial with the host computer. The host computer can be configured to associate the vial with a database.

The present disclosure relates, in various embodiments, to a method of encoding a vial and linking the vial to a database. The vial can be inserted into a receptacle of an RFID device. The RFID device can include a housing. The housing can have the receptacle and an RFID reader. The RFID tag can be applied to the vial by the applicator. An identifier of the vial can be associated with the vial by the RFID reader. The identifier can be communicated to a host computer by the RFID reader. The host computer can associate the identifier with the database. The one or more transceivers inside or near a storage apparatus can communicate with the host computer. The one or more transceivers can be configured to communicate with the vial.

DETAILED DESCRIPTION

Figure 1:
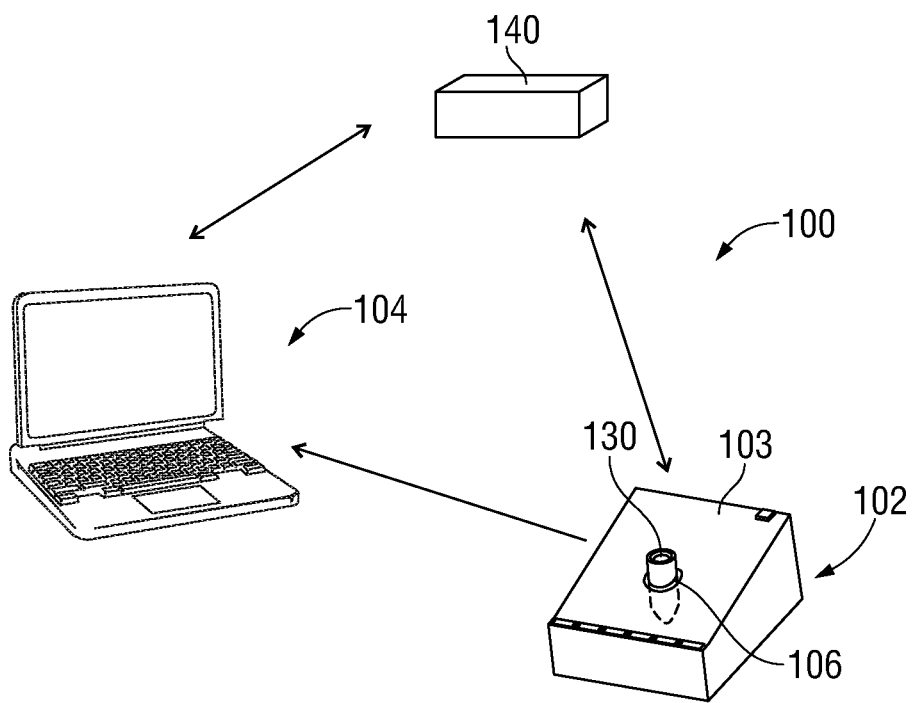
FIG. 1 illustrates an embodiment of an RFID system according to the present disclosure.

The present disclosure can be understood more readily by reference to the following detailed description, drawings, examples, and claims, and their previous and following description. However, before the present compositions, articles, devices, and methods are disclosed and described, it is to be understood that this disclosure is not limited to the specific compositions, articles, devices, and methods disclosed unless otherwise specified, as such can, of course, vary. It is also to be understood that the terminology used herein is for the purpose of describing particular aspects only and is not intended to be limiting.

The following description of the disclosure is provided as an enabling teaching of the disclosure in its currently known embodiments. To this end, those skilled in the relevant art will recognize and appreciate that many changes can be made to the various aspects of the disclosure described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

Reference will now be made in detail to the present preferred embodiment(s), examples of which are illustrated in the accompanying drawings. The use of a particular reference character in the respective views indicates the same or like parts.

As noted above, broadly, this disclosure teaches a system and a method that provide RFID techniques. The system enables vial level tracking (VLT). The system can automatically apply RFID tags to existing vials and encode the tag with relevant information. This can allow standard vials to be used in the VLT system that do not have a tag pre-applied. In one embodiment, an RFID device can be used to link a specific vial sample to a database record. The system according to one embodiment can provide one or more of the following functions such as, for example: RFID tag application, vial labelling, and data encoding. The functions can work independently of each other.

As shown in FIG. 1, an RFID system 100 can include an RFID device 102 and a host computer 104. The RFID device 102 can include a housing 103 with a receptacle 106. The receptacle 106 can be designed (e.g., configured) to receive one or more vials 130. In FIG. 1, the vial 130 can be other types of containers such as flasks. The RFID device 102 can associate the vial 130 with an identifier. The RFID device 102 can communicate the identifier of the vial 130 to the host computer 104. The communication can be wireless, wired, or some combination thereof. The host computer 104 can associate the vial 130 and/or its identifier with a database 140. The database 140 can be part of or attached to the host computer 104 or can be remotely located relative to the host computer 104. For example, the database 140 can be communicatively coupled to the host computer 104 through one or more networks (e.g., cellular networks, communication networks, local area networks, the Internet, Ethernet, etc.). In some embodiments, the database 140 can be a part of a remote server, a storage cloud, a storage area network (SAN), etc. In some embodiments, the database 140 can be a "cloud" on its own. In some embodiments, the database 140 can be a database abstracted away into application programming interface (API) calls (e.g., in a cloud RFID platform such as Jetstream® Cloud RFD Platform).

Serialized tracking information, which is available through the use of RFID technology, can be stored and organized within a database in accordance with a logical data model. The logical data model can include, for example, a plurality of entities and relationships defining the manner in which serialized vial tracking information is stored and organized within the database. In some embodiments, the vial 130 can be identified along with the contents inside the vial and can be identified with respect to other vials such as having the same contents, coming from the same lot, and/or being in the same box or kit.

Figure 2:
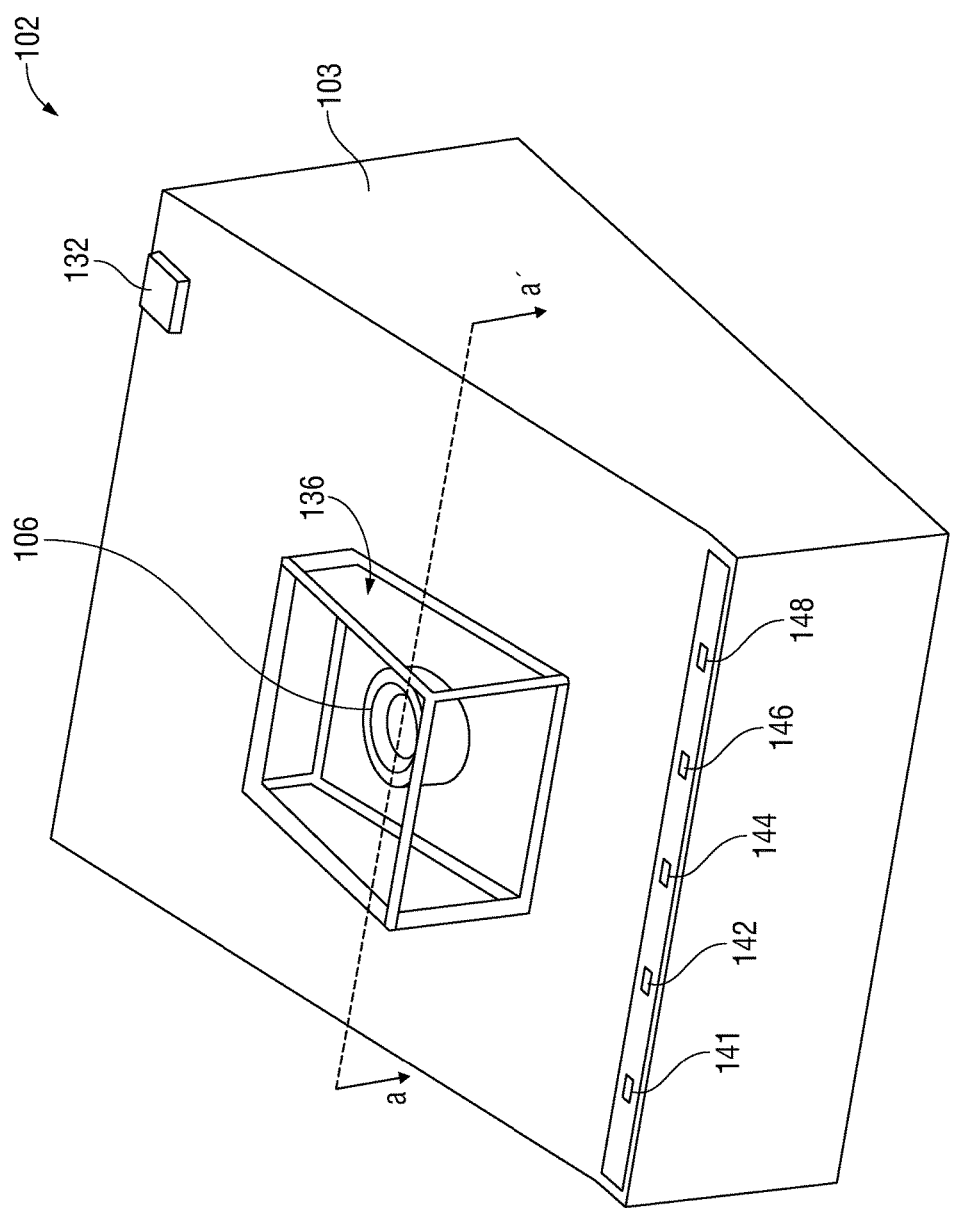
FIG. 2 is a schematic view of an embodiment of an RFID device shown in FIG. 1.

As shown in FIG. 2, the RFID device 102 can include a cover 136 configured to enclose the receptacle 106 of the RFID device 102. The cover 136 can be connected to the housing 103 of the receptacle 106 via a hinge (not shown). The RFID device 102 can further include an input device. The input device can be a push button 132, for example. Some embodiments contemplate that the RFID device 102 have one or more input devices including one or more of the following: one or more buttons, a sensor, the cover 136, a graphical user interface, a touch-sensitive screen, a voice recognition system, a wireless input device, a remote controller, a keypad, and a keyboard. Other embodiments can be used without any of the listed input devices or without additional input devices.

The receptacle 106 of the RFID device 102 can be configured to accommodate a plurality of the vials 130. In some embodiments, the receptacle 106 can be configured to accommodate more or less than 16 vials, for example. In some embodiments, the vial 130 can have an existing RFID tag. In some embodiments, the RFID device 102 can apply RFID tags to the vials. In some embodiments, the vials can be flasks or other types of containers.

The RFID device 102 can further include a plurality of indicators such as indicators 141, 142, 144, 146, 148. The indicator 141 can indicate, for example, whether the power of the RFID device 102 is on. When the power is on, the indicator 141 can provide a green light, for example. The RFID device 102 can have other output devices or indicators including, for example, one or more of the following: a display, a touch-sensitive display, an audio output, a communication device, a communication interface, a printer, etc. The RFID device can be connected to the host computer 104 via, for example, USB, FireWire, Ethernet, serial connections, WiFi, Bluetooth, IEEE 802.11, ZigBee, wireless, wired, or a persistent connection or link on which to relay data to a server-hosted application.

The RFID device 102 can further include a cooling and/or heating element to keep the sample cool/warm while in the apparatus. The cooling and/or heating element may take on many forms in practice, such as circulating cold or hot fluid (e.g., water) around the sample.

Figure 3:
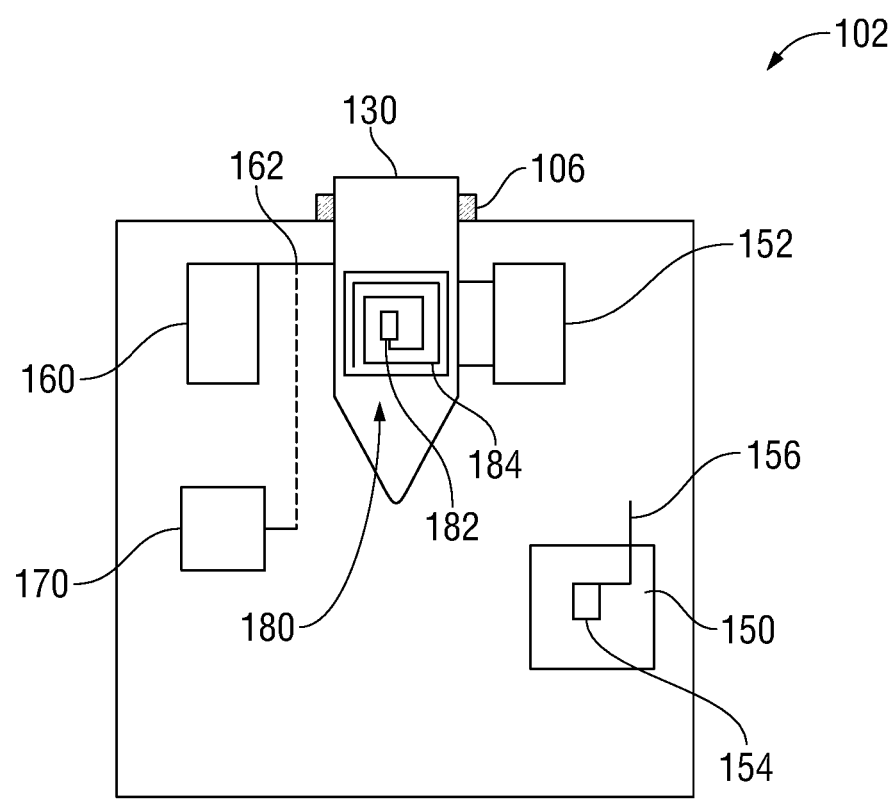
FIG. 3 is a cross sectional view of the RFID device along the line a-a' of FIG. 2 in accordance with an embodiment of the present disclosure.

As shown in FIG. 3, the RFID device 102 can include an RFID reader 150. In some embodiments, the RFID reader 150 can include one or more antennas 156. In some embodiments, the RFID reader 150 can include, for example, an integrated circuit chip 154 in addition to the antenna 156. The RFID device 102 can include an applicator 160, which can be configured to automatedly label the vial 130 by applying an RFID tag to the vial. The RFID tag 180 can have one or more antennas 184 and/or a chip 182. The chip 182 can each include a respective processor and/or a respective memory (e.g., non-transitory memory) according to some embodiments. The processor can execute instructions or code that is stored in the processor or in the memory to perform one or more of the functions described in the present disclosure. The antenna 156 of the RFID reader 150 can be configured to communicate with the RFID tag 180 and the host computer 104 (as shown in FIG. 1).

The applicator 160 can include an arm 162. The RFID device 102 can further include a spool that includes the RFID tags, an access port configured for manually or automatically feeding the RFID tags, or a cartridge 152 that can include a plurality of RFID tags or a storage device that includes the RFID tags. A storage device may be structured to prevent the RFID tags from being read. An actuator 170, such as a motor, of the RFID device 102 can be configured to communicate with the applicator 160, for example, the arm 162 of the applicator 160, to apply the RFID tag from the cartridge 152 to the vial 130, thereby labelling the vial 130 with the RFID tag 180. In some embodiments, a heat shrink style tag can be used (thus a heat shrink label cartridge can be employed). In some embodiments, a metal mountable tag can be used also. The RFID device 102 can also include a foot (not shown) inside the housing 103 that pushes up the vial 130 out of the receptacle 106 to allow a user to pull the vial 130 out easily once the RFID labelling process is complete.

Figure 4:
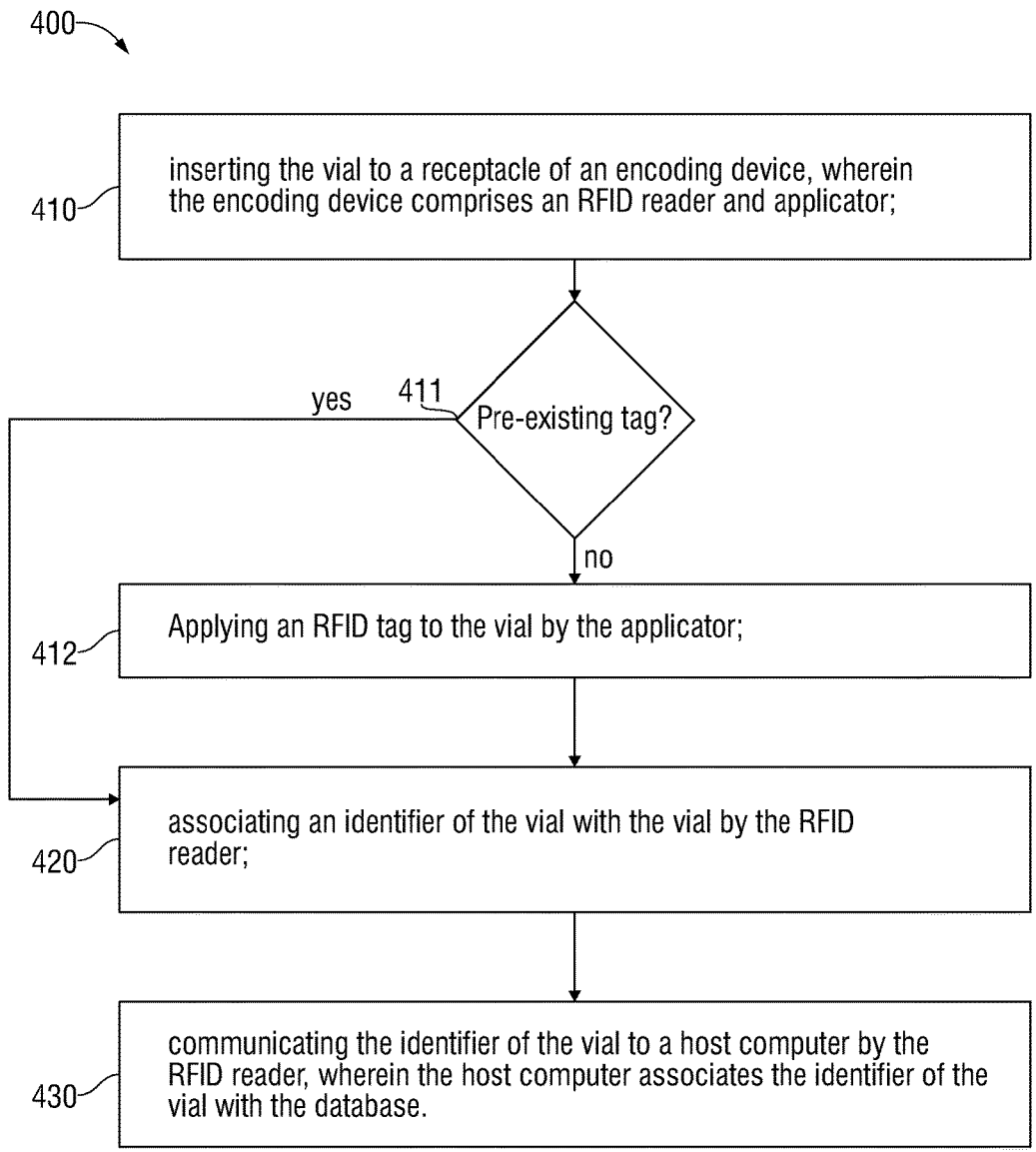
FIG. 4 is a flow diagram illustrating a method of encoding a vial and linking the vial to a database according to an embodiment of the present disclosure.

FIG. 4 shows an embodiment of a method 400 that can be designed to encode a vial 130 and to link the vial to a database according to the present disclosure. In step 410, one or more vials 130 are inserted into a receptacle 106 of an RFID device 102. The indicator 142 (shown in FIG. 2) can indicate whether the vial 130 has been correctly inserted inside the receptacle 106. If the vial 130 is inserted into the receptacle 106 correctly, the indicator 142 can indicate this by a green light, for example. In query 411, the RFID device 102 determines, automatically or manually, whether the vial 130 has a pre-existing tag or if the RFID tag is already embedded in the casing of the vial 130. If the vial does not have a pre-existing tag, then the process jumps to step 420. If the vial 130 does not have a pre-existing tag, then the process jumps to step 412 in which the applicator 160 of the RFID device 102 applies an RFID tag 180 onto the vial 130. In some embodiments, a user can press a button 132 (e.g., a push button) to trigger the RFID tag application. In some embodiments, the cover 136 can provide an input signal.

For example, by closing the cover 136, the RFID tag application can be triggered. The indicator 142 can display application status such as, for example, the percentage of the RFID tag application that has been completed. The indicator 142 can also provide a green light when the RFID tag 180 has been successfully applied. In step 412, the RFID reader 150 of the RFID device 102 reads the identifier encoded in the RFID tag 180 that has been applied to the vial 130. In some embodiments, the RFID reader 150 can have an antenna and/or a wireless transceiver that can transmit or receive radio frequency signals. In step 420, the RFID device 102 or the RFID reader 150 can associate the identifier of the vial 130 with the vial 130 or the contents of the vial 130. In some embodiments, this step can include information, input by the user, about the vial or its contents, and the RFID device 102 or the RFID reader 150 associating the vial 130 including the information with the identifier. The information can also be automatically provided for association. The information and/or the identifier can be stored on the RFID tag 180. In step 430, the RFID device 102 or the RFID reader 150 can communicate the associated identifier and vial information to a database (e.g., a relational database) stored and/or maintained at the host computer 104 (e.g., a server). In some embodiments, RFID device 102 can have a printer (not shown) inside the housing 103 so that the RFID device 102 can print user friendly information on the vial. In some embodiments, RFID device 102 can have a QR code reader or barcode reader to parse out existing information. In some embodiments, the host computer 104 makes the association between the associated identifier and the vial information. In some embodiments, the RFID device 102 can transmit the associated identifier and vial information over one or more networks that include one or more wired and/or wireless links.

In some embodiments, the RFID device 102, the RFID reader 150, the RFID tags 180, and/or any other RFID components, subcomponents, systems, and subsystems are compliant with the EPC Radio-Frequency Identity Protocols.

In operation according to some embodiments, the RFID tag 180 can store data on its chip 182. The data can include, for example, one or more of the following: names of specimen contained by the vial, an expiration date, a generation date of specimen, a lot number, a description, and a unique code or identifier.

To scan the RFID tag of the vial 130, the RFID reader 150 or an RFID interrogator (e.g., an RFID transceiver, an RFID transmitter, etc.) transmits data as RF signals that are received by the RFID antenna 184 of the RFID tag 180. The RF signals are received by the RFID tag 180. The energy in the RF signals received by the RFID antenna can be stored and used to power the chip 182 of RFID tag 180. The chip 182 transmits the encoded data over its RFID antenna 184 back to the RFID reader 150. The code can be used to identify, for example, a particular vial and its respective contents contained therein. The indicator 144 can display a reader status. The indicator 144 can display red (or some other color or indication) when the reader is working on extracting the code from the received electromagnetic radiation or if there is an extraction error. The indicator 144 can show a green light (or some other color or indication) when the reader finishes extracting the code or if the code has been successfully extracted.

The indicator 146 can indicate status of encoding data on the vial 130. The indicator 146 can display red (or some other color or indication) when the data are being encoded. The indicator 146 can show a green light (or some other color or indication) when the data have been encoded. The indicator 148 can indicate status of a host connection, such as creating the new entry in the database in the host computer.

In some embodiments, the RFID device 102 can be connected to the host computer 104 via USB, FireWire, Ethernet, or a persistent connection to relay data to a server-hosted application. A connector (not shown) between the host computer 104 and RFID device 102 can be on the top, back, or side of the RFID device 102. Such connections can also be used to power the RFID device 102. Some embodiments provide the RFID device 102 and the host computer 104 communicates over wireless and/or wired connections. The host computer 104 can receive information about the nearby storage apparatus via the cloud or data from a remote server. The host computer 104 can then receive real-time information about each of the vials in the storage apparatus and update its database. The transceiver can be connected to a reader of the storage apparatus into which vials can be placed or stored. The storage apparatus can include, for example, its own processor and a non-transitory memory. Further, the storage apparatus can be connected to the network(s), such as cloud platforms, of the host computer 104, the RFID device 102, and/or the database 140. When a user removes the vial 130 from the RFID device 102 and places inside the storage apparatus (e.g., a cabinet, suitcase, cart, etc.), the transceiver of the storage apparatus can scan the vials. The scan can occur periodically or after a particular condition is met (e.g., the closing of the door of the storage apparatus, a request from a user, etc.).

In some embodiments, the RFID device 102 can be used as a vial array device and accommodate an array of vials 130 by encoding several vials simultaneously or serially. For example, the vials 130 can have pre-existing RFID tags. The RFID reader of the RFID device can be configured to concurrently read more or less than approximately 16 RFID tags, for example, on the vials 130. In one embodiment, the RFID reader 150 can read one RFID tag at a time of the plurality of vials 130 inserted in the RFID device 102 at the same time. In some embodiments, this is facilitated by the RFID reader 150 and/or the RFID tags 180 employing the RF signal, such as at new-field regions.

In some embodiments, a plurality of vials 130 can be logically linked or encoded together as a single entity having the same contents, such as cancer cells from the same host, or belonging to the same lot, in the same box, or a logical container. The RFID reader 150 can be isolated per each vial location, for example, so that only the vial tag placed in each location can be reported to the system. This would be accomplished using an antenna array—one per location—with a limited read zone.

The present disclosure is of the best currently contemplated mode of carrying out exemplary embodiments. The description is not to be taken in a limiting sense, but is made merely for the purpose of illustrating the general principles, since the scope of the embodiments is best defined by the appended claims.

Various inventive features are described herein that can each be used independently of one another or in combination with other features.

Exemplary embodiments can take the form of an entire hardware embodiment, an entire software embodiment (including firmware, resident software, micro-code, etc.) or an embodiment combining software and hardware aspects that can all generally be referred to herein as a "circuit," "module" or "system." Furthermore, exemplary embodiments can take the form of a computer program product embodied in any tangible medium of expression having computer-usable program code embodied in the medium.

Any combination of one or more computer usable or computer readable medium(s) can be utilized. The computer-usable or computer-readable medium can be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium can be any medium that can contain, store, communicate, propagate, or transport the program for use by or in connection with the instruction performance system, apparatus, or device. The computer-usable medium can include a propagated data signal with the computer-usable program code embodied therewith, either in baseband or as part of a carrier wave. The computer usable program code can be transmitted using any appropriate medium, including but not limited to wireless, wireline, optical fiber cable, and radio frequency (RF).

Computer program code for carrying out operations of embodiments can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Embodiments are described herein with reference to methods, processes, steps, acts, flowchart illustrations, and/or block diagrams of methods, apparatus (systems), and computer program products. It will be understood that methods, processes, steps, and/or each block of the flowchart illustrations and/or block diagrams, and combinations of blocks in the flowchart illustrations and/or block diagrams, can be implemented by computer program instructions.

These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The processor can also be a part of any of the components and/or elements described herein.

These computer program instructions can also be stored in a computer-readable medium (e.g., a non-transitory computer-readable medium) that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions can also be loaded onto a computer or other programmable data processing apparatus to cause a series of operational steps to be performed on the computer or other programmable apparatus to produce a computer implemented process such that the instructions, which execute on the computer or other programmable apparatus, provide processes for implementing the functions/acts specified in the flowchart and/or block diagram block or blocks. The computer-readable medium, computer, and/or other programmable data processing apparatus can be part of any of the components and/or elements described herein.

It will be apparent to those skilled in the art that the methods and apparatuses disclosed herein could be applied to a variety of structures having different geometries and to create selectively coated and uncoated portions of varying shapes, sizes, and orientations. It will also be apparent to those skilled in the art that various modifications and variations can be made without departing from the spirit or scope of the invention.

What is claimed is:

1. A radio frequency identification (RFID) device, comprising:
   a housing having a receptacle wherein the receptacle is configured to receive a vial;
   an applicator configured to apply an RFID tag to the vial; and
   an RFID reader having at least one antenna configured to communicate with the RFID tag and a host computer.

2. The RFID device of claim 1, further comprising an actuator in communication with the applicator to apply the RFID tag to the vial.

3. The RFID device of claim 1, further comprising a plurality of indicators.

4. The RFID device of claim 1, further comprising an input device.

5. The RFID device of claim 4, wherein the input device comprises one or more of the following: one or more buttons, a graphical user interface, a touch-sensitive screen, a voice recognition system, a wireless input device, a remote controller, and a keyboard.

6. The RFID device of claim 1, further comprising one or more of the following: a cartridge that includes the RFID tags; a spool that includes the RFID tags; an access port configured for manually feeding the RFID tags or automatically feeding the RFID tags; a storage device that includes the RFID tags; and a heating or cooling element.

7. The RFID device of claim 6, wherein the storage device is structured to prevent the RFID tags from being read.

8. The RFID device of claim 1, wherein the RFID tag has a first chip and a first antenna.

9. The RFID device of claim 8, wherein the first chip stores data that are readable by a reader.

10. The RFID device of claim 8, wherein the RFID tag is configured to store a unique code or identifier.

11. A radio frequency identification (RFID) system, comprising:
an RFID device comprising a housing having a receptacle, wherein the receptacle is configured to receive a vial, wherein the RFID device is configured to associate the vial with an identifier; and
a host computer operatively coupled to the RFID device, wherein the RFID device is configured to communicate the identifier of the vial to the host computer, wherein the host computer is configured to associate the identifier with a database, and wherein the RFID device includes an applicator configured to apply an RFID tag to the vial.

12. The RFID system of claim 11, wherein the RFID device further comprises an RFID reader.

13. The RFID system of claim 11 further comprises an RFID tag, wherein the RFID tag comprises a chip and an antenna.

14. The RFID system of claim 11, wherein the vial has an existing RFID tag.

15. The RFID system of claim 11, wherein the applicator is configured to apply the RFID tag to the vial.

16. The RFID system of claim 11, wherein the RFID device includes a plurality of indicators.

17. The RFID system of claim 11, wherein the RFID device comprises an actuator in communication with the applicator to apply the RFID tag to the vial.

18. The RFID system of claim 11, wherein the RFID device comprises a cover configured to enclose the receptacle.

19. The RFID system of claim 11, wherein the RFID device comprises one or more input devices.

20. The RFID system of claim 19, wherein the one or more input devices include one or more of the following: one or more buttons, a graphical user interface, a touch-sensitive screen, a voice recognition system, a wireless input device, a remote controller, and a keyboard.

21. The RFID system of claim 11, wherein the receptacle of the RFID device is configured to accommodate a plurality of the vials, wherein the plurality of the vials has pre-existing RFID tags or non pre-existing RFID tags.

22. The RFID system of claim 11, wherein the applicator is configured to print or label the vial.

* * * * *